United States Patent
Michelau et al.

(10) Patent No.: US 7,222,871 B2
(45) Date of Patent: May 29, 2007

(54) TRICYCLE PUSH HANDLE

(75) Inventors: Frederick Michelau, Des Plaines, IL (US); Thomas Schlegel, Wheaton, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 11/113,588

(22) Filed: Apr. 25, 2005

(65) Prior Publication Data

US 2006/0237947 A1 Oct. 26, 2006

(51) Int. Cl.
*B62H 7/00* (2006.01)

(52) U.S. Cl. .................. 280/293; 280/304; 280/304.5; 280/655.1; 280/655; 280/47.315; 280/47.371

(58) Field of Classification Search ................ 280/293, 280/304, 304.5, 655, 655.1; 16/113.1, 405, 16/429
See application file for complete search history.

(56) References Cited

U.S. PATENT DOCUMENTS

| 5,028,066 A * | 7/1991 | Garth ......................... 280/282 |
| 5,303,944 A | 4/1994 | Kalmus ..................... 280/288.4 |
| 5,338,204 A | 8/1994 | Herndon ..................... 434/247 |
| 5,531,494 A | 7/1996 | Singleton ..................... 294/1.1 |
| 5,577,750 A | 11/1996 | Sklar ............................ 280/293 |
| D384,602 S | 10/1997 | Anderberg .................. D12/114 |
| 6,149,178 A | 11/2000 | Bradbury et al. ............ 280/293 |
| 6,161,847 A | 12/2000 | Howell et al. ................. 280/30 |
| 6,447,002 B1 * | 9/2002 | Fang ............................ 280/646 |
| 6,663,115 B2 | 12/2003 | Song .......................... 280/7.17 |
| 6,923,466 B2 * | 8/2005 | Tsai ............................. 280/646 |
| 2004/0080139 A1 * | 4/2004 | Kettler et al. ................ 280/293 |
| 2005/0173896 A1 * | 8/2005 | Kim et al. .................... 280/655 |

* cited by examiner

*Primary Examiner*—Lesley D. Morris
*Assistant Examiner*—Marlon Arce-Diaz
(74) *Attorney, Agent, or Firm*—DLA Piper US LLP; R. Blake Johnston (57) ABSTRACT

A push handle for a child's vehicle has an elongated body with at least two elongated tubes of different diameters configured in a telescoping relation where the tube(s) of smaller diameters are slidable within the tube(s) of larger diameters between an extended state and a retracted state. The tubes include a top tube with a top end and a bottom tube. The bottom tube is fixed to the child's vehicle. A grip is mounted on the top end of the top tube for gripping by a user's hand. A locking mechanism is disposed within the body for locking the tubes in either the extended state or the retracted state. A release device is disposed on the body and activated for remotely unlocking the locking mechanism so that the body may be moved between the extended and retracted states.

27 Claims, 11 Drawing Sheets

TRICYCLE PUSH HANDLE

FIELD OF THE INVENTION

The present invention is generally related to push handles for a child's vehicle. More specifically, the invention is directed to extendable and retractable push handles that permit a parent to control a tricycle while a child is riding the tricycle.

BACKGROUND OF THE INVENTION

Conventional push handles attached to the back of bicycles are known and typically include a long bar as disclosed by U.S. Pat. Nos. 5,338,204; 5,531,494; 6,149,178; or D384,602. These designs, however, typically require that the handle be removed from the bicycle in order to ride it without a user holding the handle. Otherwise, the handle may interfere with the motion and balance of the bicycle. These handles also extend substantially from the frame of the bicycle making it difficult to store the bicycles with the handles still attached.

For further convenience, U.S. Pat. Nos. 6,149,178 and 5,303,944 disclose push handles with adjustable lengths for tricycles or bicycles. These push handles are made of two bars where one of the bars telescopes or slides into the other bar. A locking nut is provided at the connection of the two bars to hold them at an adjusted length. The push handles on these designs, however, still interfere with motion and balance of the cycles if the handle is released while a child is riding the bicycle or tricycle. In addition, adjusting the length of the push handle by loosening and tightening the lock nut can be difficult, such as when the lock nut is tightened too tight. This is especially true when it is necessary to maintain a tight grip on the push handle while adjusting the length of the push handle (such as when a child on the vehicle is attempting to move the bicycle or tricycle away from the parent for example).

Known folding or rotating push handles on tricycles are also known. These push handles fold under the tricycle when the tricycle is to be stored as disclosed by U.S. Pat. Nos. 6,161,847 and 6,663,115. However, the folding of these push handles is cumbersome and requires the lifting or overturning of the tricycle to accomplish the folding of the push handle.

Finally, none of the bicycle or tricycle push handles of the prior art provide a grip that has an adjustable angle relative to the main body of the push handle. Since the angle at which a user's hand extends (relative to the main length of the push handle) comfortably and for the strongest grip varies widely, a grip that is fixed relative to the length of the push handle provides a limited range of comfort and/or force for the user.

SUMMARY OF THE INVENTION

The problems mention above are solved by the present invention, which is directed to an improved push handle for a child's vehicle. More specifically, a push handle for a child's vehicle according to the present invention has an elongated body with at least two elongated tubes of different diameters configured in a telescoping relation where the tube(s) of smaller diameters are slidable within the tube(s) of larger diameters between an extended state and a retracted state. The tubes include a top tube with a top end and a bottom tube. The bottom tube is fixed to the child's vehicle. A grip is mounted on the top end of the top tube-for gripping by a user's hand. A locking mechanism is disposed within the body for locking the tubes in either the extended state or the retracted state. A release device is disposed on the body and activated for remotely unlocking the locking mechanism so that the body may be moved between the extended and retracted states.

In another aspect of the invention, a push handle for a child's vehicle has a single, elongated body with a bottom portion for attaching to the vehicle and a top end. A grip is rotatably mounted on, and rotatable relative to, the top end. This grip is selectively rotatable to a plurality of positions.

In yet another aspect of the invention, the invention is directed to a tricycle with a retractable push handle that has an elongated body. The body has at least two elongated tubes disposed in a telescoping relation for providing an adjustable length, a top end and a grip portion mounted on the top end. A seat of the tricycle has a seat back defining a hole for receiving the body and for holding the body in an elevated position.

In a further aspect of the invention, a push handle for a child's vehicle has an elongated body with a bottom attached to the vehicle and a top with a grip engagable by a user. It also has means for changing the body between an extended state and a retracted state, and means for locking the body at least at one of these states. A release device is engaged with the locking means for unlocking the body to permit adjustment of the body to one of the extended or retracted states. The release device is disposed in a vicinity of the top of the body.

In anther aspect of the invention, a push handle for a child's vehicle has an elongated body generally defining a longitudinal axis, a bottom attached to the vehicle and a top end attached to a grip engagable by a user. The push handle also has means for adjusting the body between a retracted state and an extended state as well as means for rotating the grip relative to the top end of the body and relative to the longitudinal axis of the body. The grip is rotatable to a selected one of a plurality of positions.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
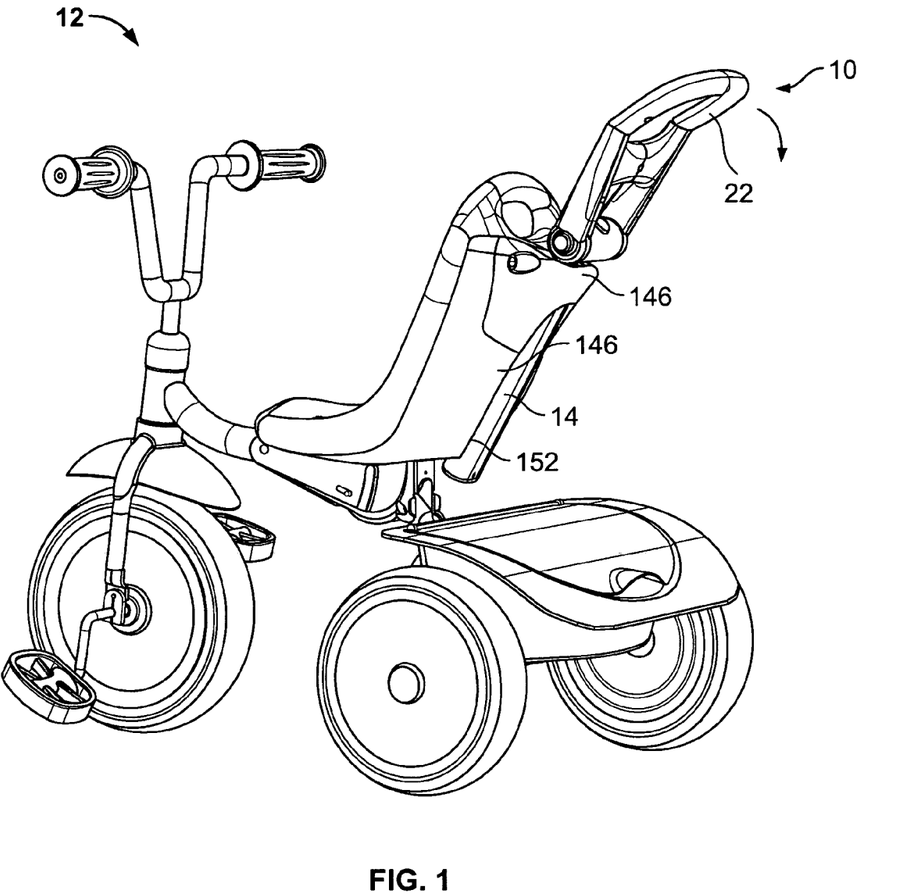
FIG. 1 is a side and rear perspective view of an embodiment of the push handle of the present invention mounted on a tricycle in accordance with the present invention.

The improved push handle of the present invention is generally indicated at 10 and is shown in FIG. 1 mounted on a child's vehicle 12, and particularly, a tricycle. It will be appreciated that the push handle of the present invention can be attached to any child's vehicle or riding toy and is not necessarily limited to the tricycle shown in FIGS. 1-8. The push handle can be attached to well known four and three wheeled "push and ride" type of vehicles (i.e. riding toy cars with holes on the bottom so that the child can extend his/her legs to the ground) or any other children's vehicle, such as wagons, bicycles, wheeled or otherwise movable toys with saddle type seats as long as it has the structure or ability to fix the push handle in an elevated position.

Figure 2:
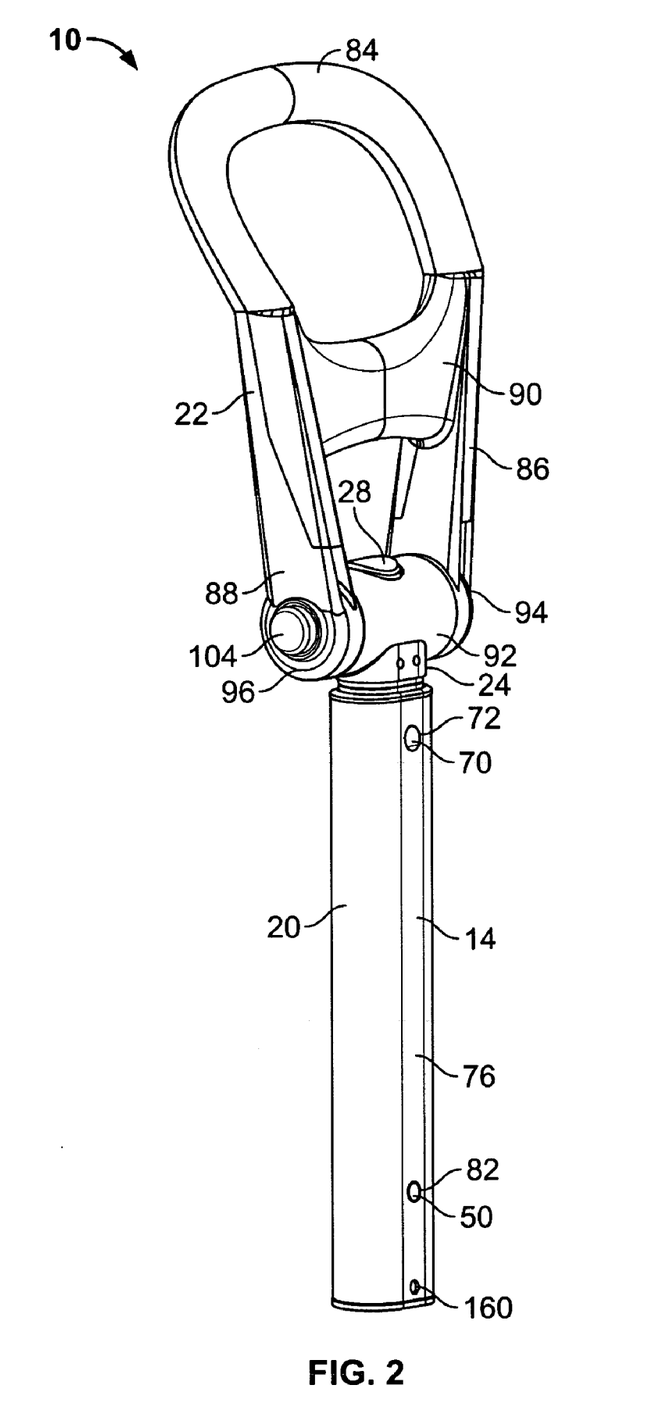
FIG. 2 is a front perspective view of the push handle in a retracted state.
Figure 3:
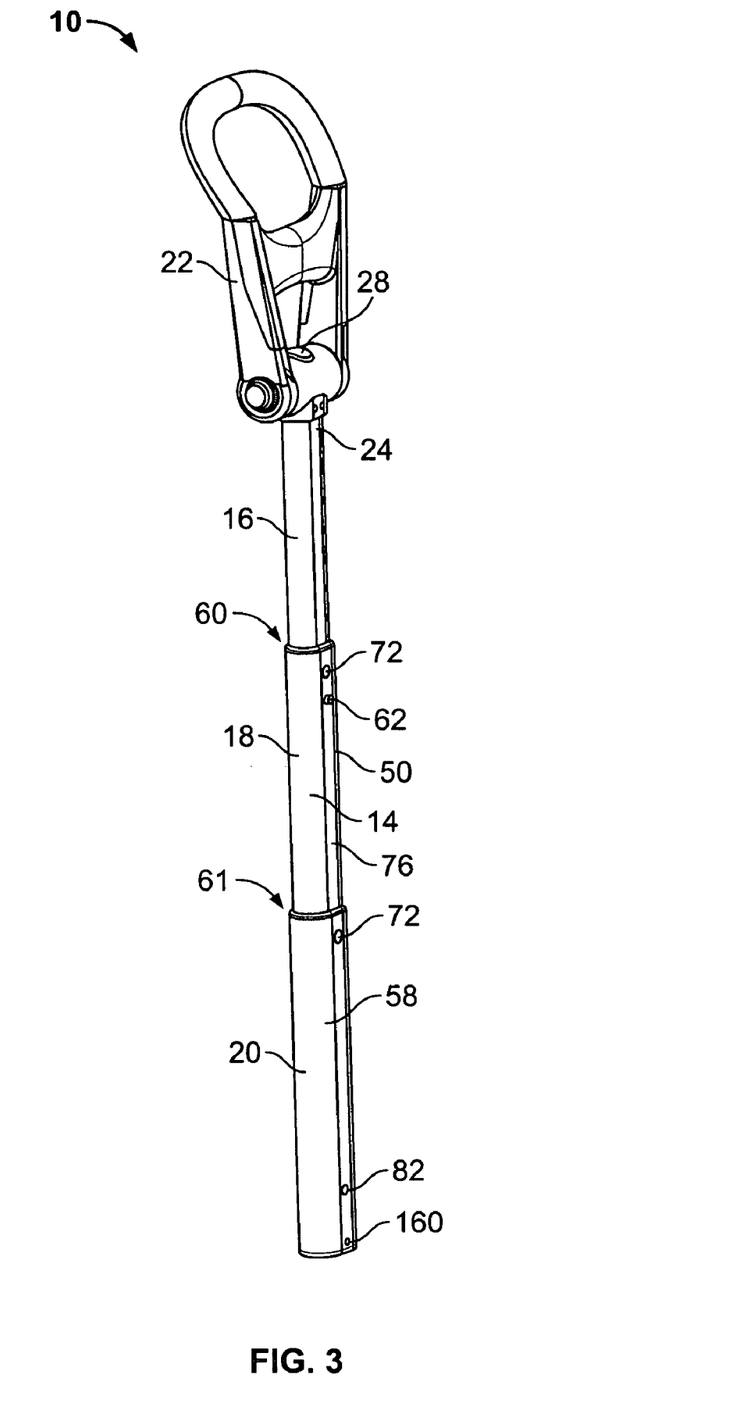
FIG. 3 is a front perspective view of the push handle in an extended state.
Figure 8:
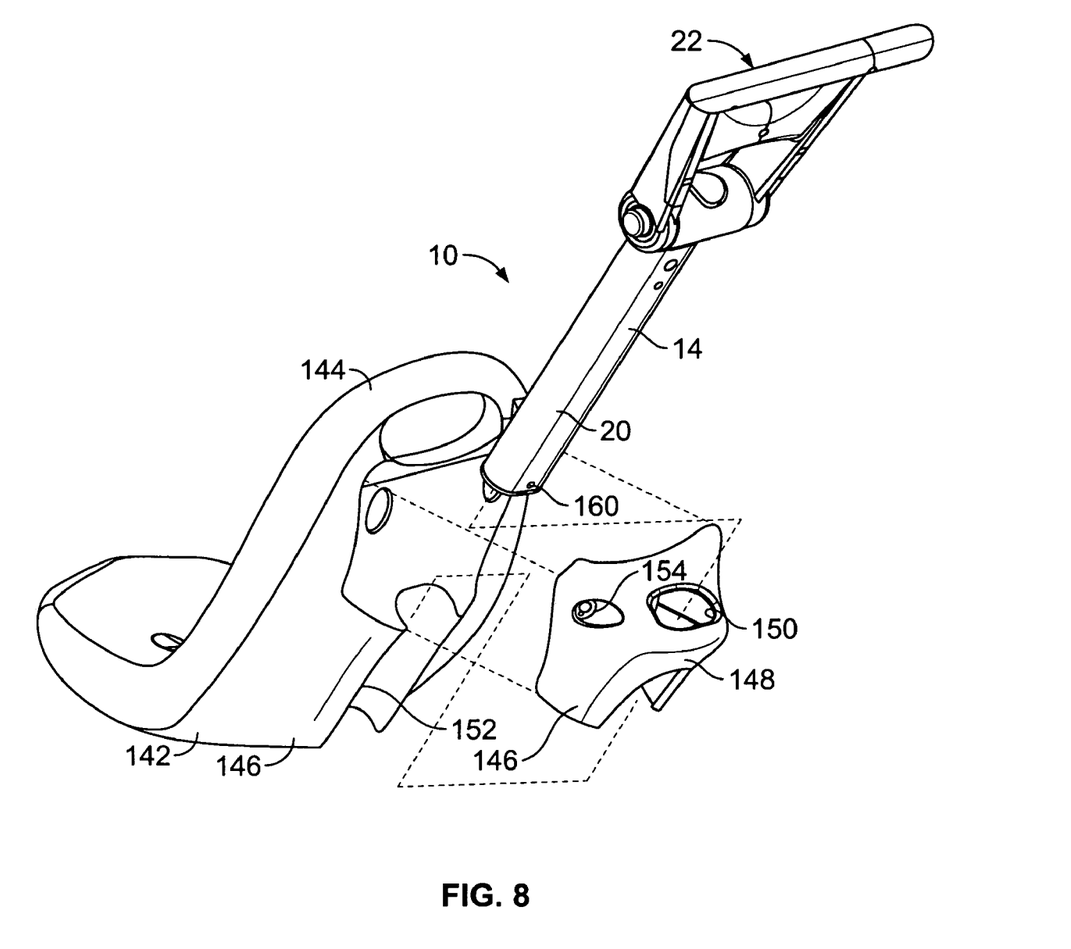
FIG. 8 is a back perspective view of a vehicle seat with the push handle of the present invention.

Referring to FIGS. 2-3, the push handle 10 has an elongated body 14 made of at least two elongated tubes of different diameters configured in a telescoping relation such that the tube of smaller diameter is slidable within the adjacent tube of larger diameter. Here, three tubes are used, a top or first tube 16, middle or second tube 18 and a bottom or third tube 20. With the telescoping of the tubes, a user can position the push handle in at least two configurations: a retracted state (shown in FIGS. 1, 2, 6 and 8) or an extended state (shown in FIGS. 3 and 5). In this embodiment, the bottom tube 20 is fixed to the vehicle as shown in FIGS. 1 and 8, and as described in further detail below. The push handle 10 also has a grip 22 mounted on a top end 24 of the top tube 16 for a user's hand to grip the push handle.

Figure 4:
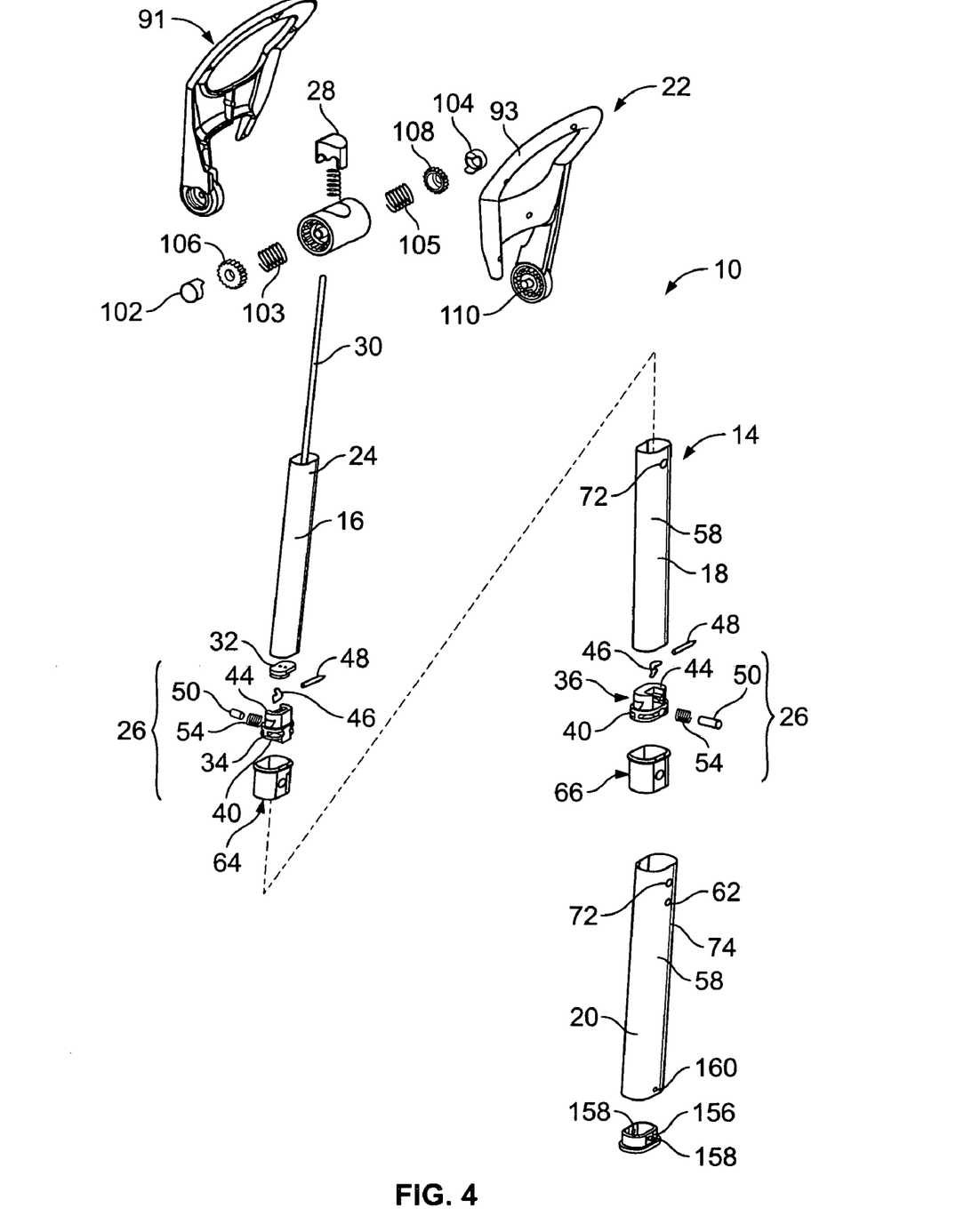
FIG. 4 is an exploded, back perspective view of the push handle.
Figure 5:
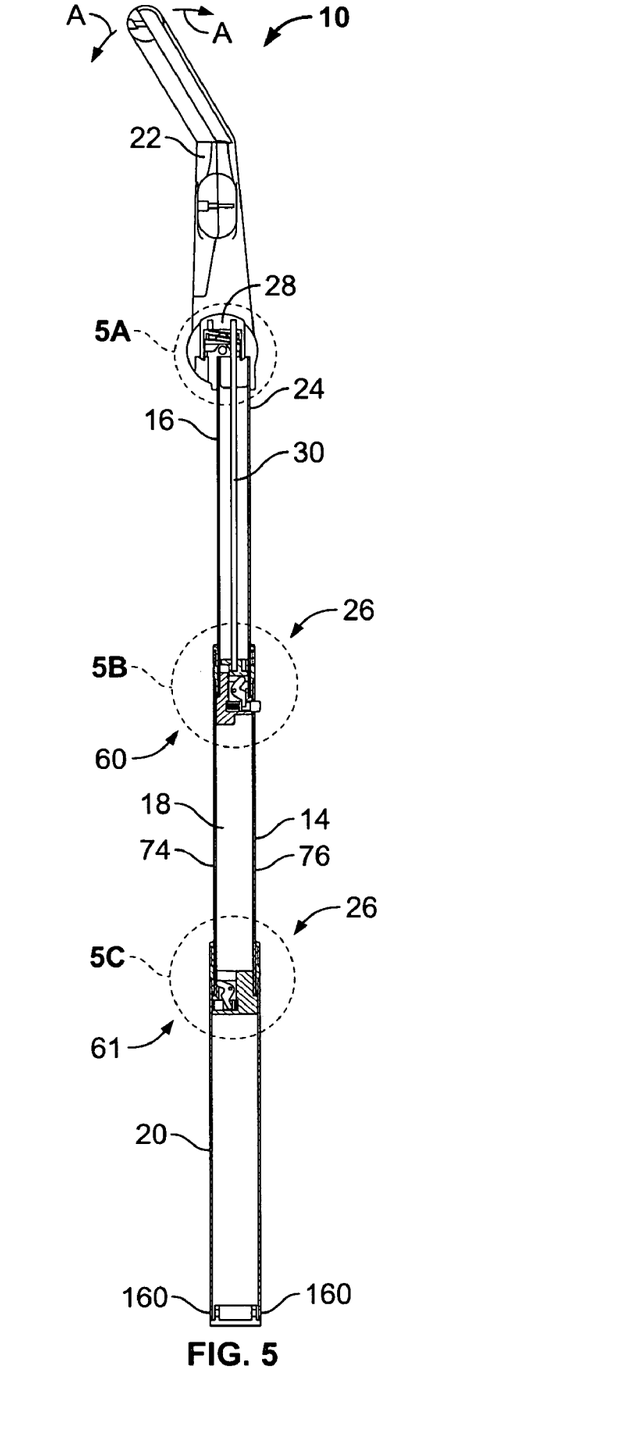
FIG. 5 is a cross-sectional, side view of the push handle in an extended state.
Figure 5A:
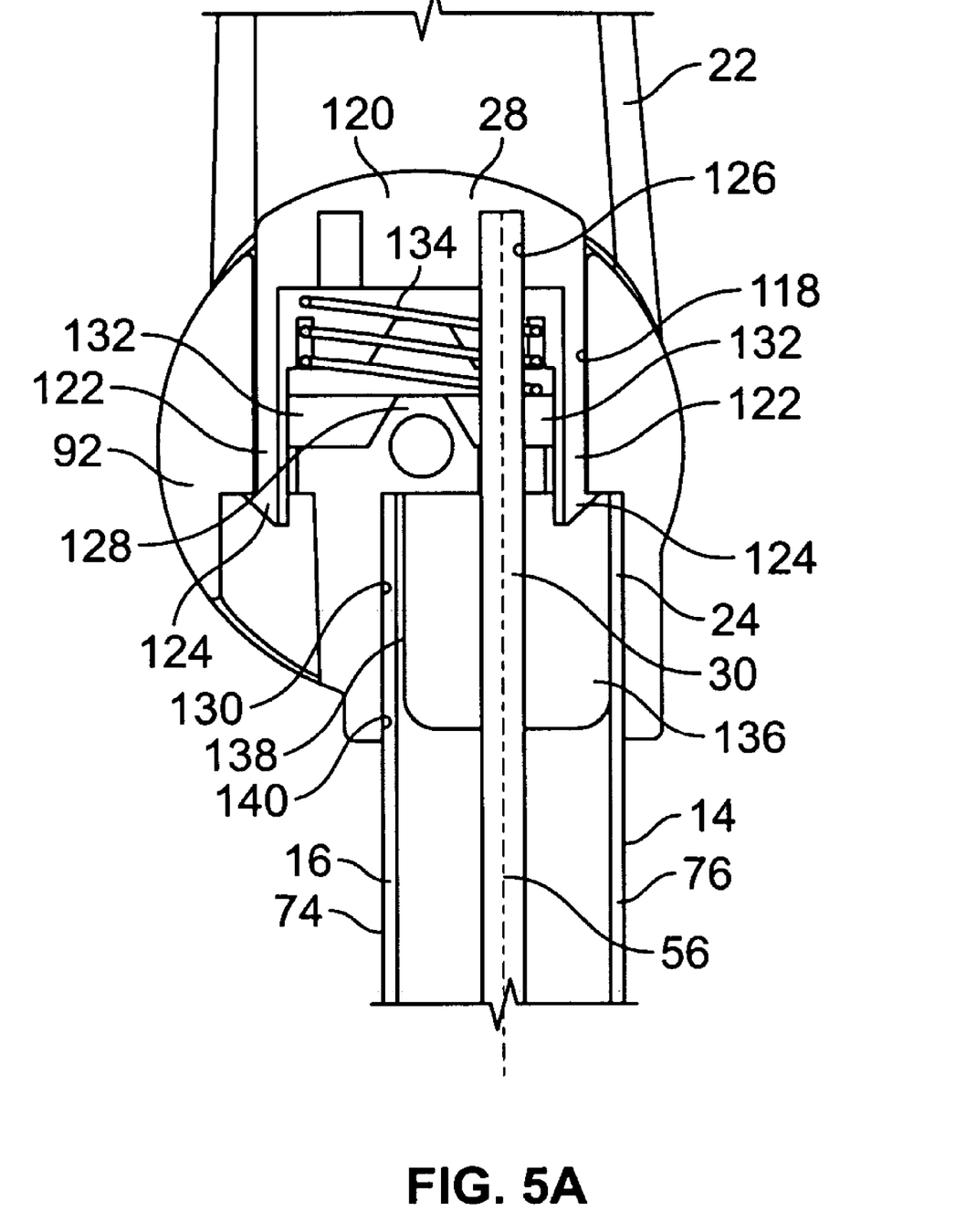
FIGS. 5A-5C are close-up views of the circled areas of the push handle indicated on FIG. 5.

Referring to FIGS. 4-5, a locking mechanism 26 is disposed within the body 14 for locking the tubes 16, 18, 20 in either the extended state or the retracted state. A release device 28 is positioned near the top end 24, and on the grip 22 for this embodiment, and is connected to an upper end of a rush rod 30. A lower end of the rush rod 30 is connected to a plunger 32 used to engage the locking mechanism 26. The plunger 32 has a downwardly extending protrusion 33 (shown in FIG. 5B) for engaging the locking mechanism 26. This positioning of the release device 28 permits a user to remotely unlock the locking mechanism 26 so that the handle body 14 may be moved between the extended and retracted states without the need for the user to bend down to manually unlock each connection 60, 61 between adjacent tubes 16, 18, 20. Here, remote connection or position means indirect connection to the locking mechanism such that the actual piece or structure (for example pin, locking bolt, etc.) directly causing the "lock" between two tubes does not need to be touched by hand or tool to unlock the locking mechanism.

The release device 28 can be any mechanism that is able to move or push rush rod 30, and in turn plunger 32, toward the locking mechanism 26. Thus, while a simple push button is shown for this embodiment, any switches, knobs, or activators that perform the same thing will suffice.

Referring to FIGS. 4, 5, 5B and 5C, the locking mechanism 26 includes a first or upper end cap 34 at the bottom of the top tube 16 and second or lower end cap 36 disposed at the bottom of each middle tube 18 (if more than one is used). The end caps 34, 36 are dimensioned to fit snugly within the end of its corresponding tube 16, 18 and include a radially extending shoulder 40 with a ledge 38 abutting the bottom most edge 42 of the tube 16 or 18. The outer diameter or width of the shoulder 40 is dimensioned to permit the widened portion of each end cap with the shoulder 40 to slide easily within the next adjacent lower tube 18 or 20 that it is disposed within.

These end caps 34, 36 each have a cut-out 44 communicating with a vertically extending slot 43 open to the top of the end cap, which in turn communicates with a horizontally extending, circular bore 45, which is open to the side of the end cap. These openings 44, 43, 45 provide space for the moving parts of the locking mechanism 26. Specifically, a pawl-lever 46 is rotatably mounted about a pawl pin 48 within slot 43. A spring pin (or simply pin) 50 lays horizontally within the bore 45 and itself has a slot 52 for receiving a lower arm 49 of the pawl-lever 46. The upper arm 47 of each pawl-lever extends upward through a corresponding cut-out 44 and is positioned to engage the plunger 32 above it. A helical spring 54 is positioned behind spring pin 50 in bore 45 to bias it away from a center or longitudinal axis 56 generally defined by the push handle (shown on FIGS. 5B and 5C), toward the outer periphery of the end caps and toward the sidewalls 58 of the tubes 16, 18, 20 when assembled. The pawl-lever 46 also acts to prevent the spring pin 50 from ejecting out of the bore 45 and handle body 14 by abutting against a back wall 51 of the slot 52 while abutting a stop wall 53 of slot 43 when a plunger is not engaged with the pawl-lever 46.

At connection 60 between adjacent tubes 16 and 18 (FIG. 5B), the lower tube 18 has an aperture 62 on its sidewall 58 for receiving and engaging the spring pin 50 for locking the adjacent tubes in the extended state and in a longitudinal position relative to each other. Similarly, connection 61 between adjacent tubes 18 and 20 has an aperture 62 on lower tube 20 for engaging pin 50 (FIGS. 4 and 5C). In the extended position, the spring 54 biases the spring pin 50 into the apertures 62 when the apertures are aligned with the pins.

Figure 5B:
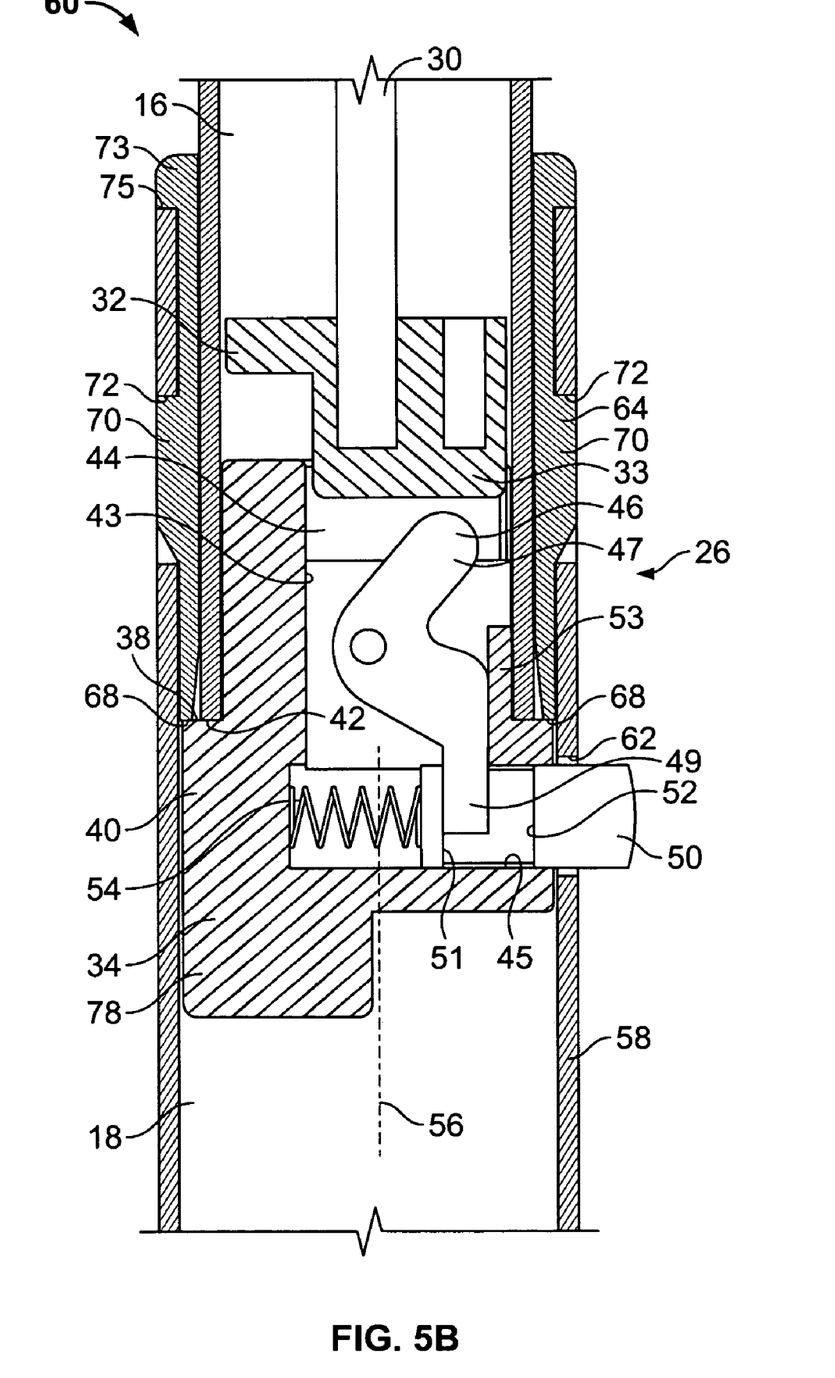
Figure 5C:
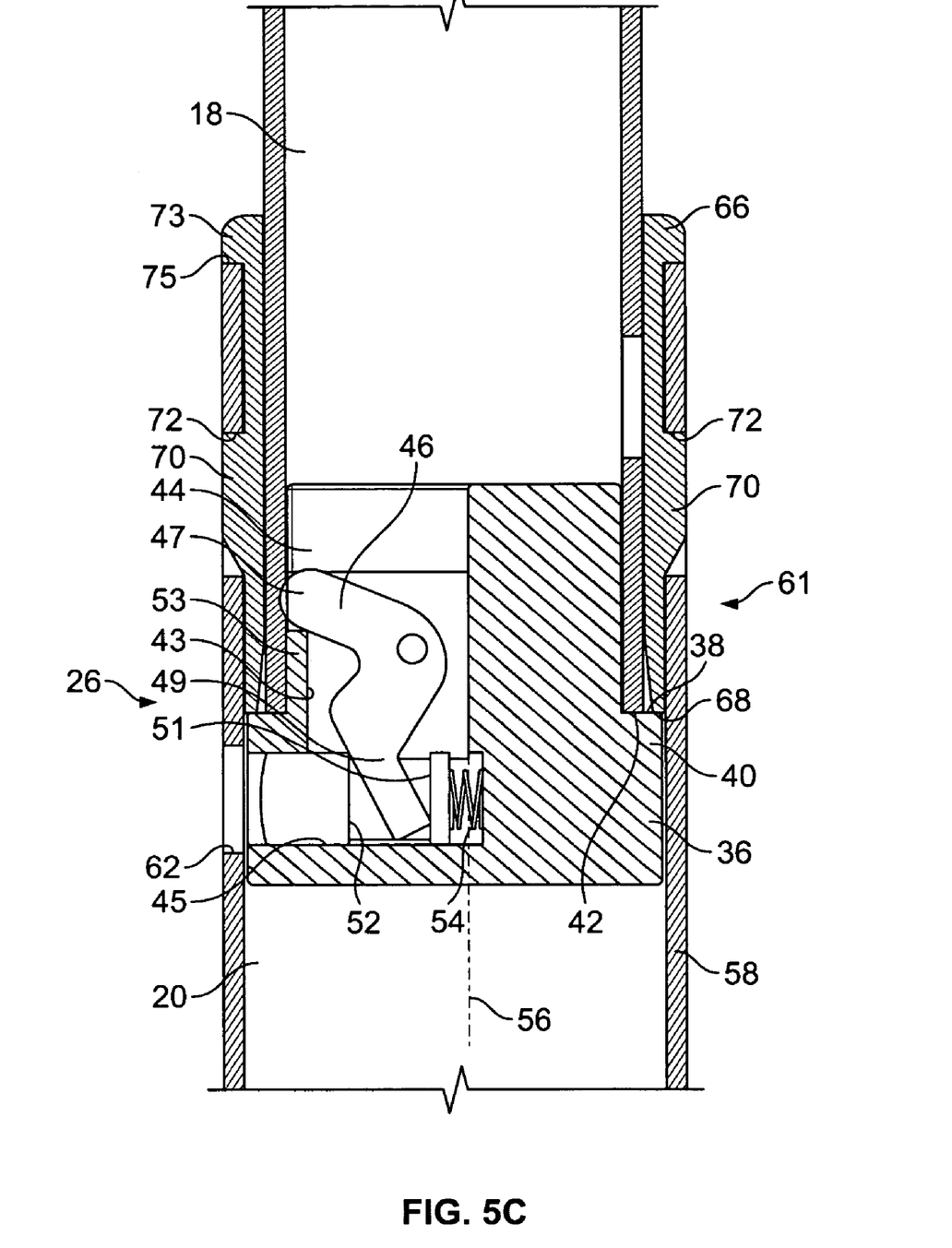

Referring to FIGS. 4, 5B and 5C, each tube 18, 20 has a sleeve 64, 66 at an upper end of connection 60 or 61, respectively, for preventing the upper tube 16, 18 from pulling all the way out of the adjacent lower tube 18 or 20, respectively. The sleeves 64, 66 have a lower edge 68 for abutting the shoulder 40 of the cap ends 34, 36 when one of the tubes 16, 18 is pulled upward. The sleeves 64, 66 have two opposing stubs 70 secured within two opposing apertures 72 defined by the sidewalls 58 of tubes 16, 18. While two stubs per sleeve are illustrated and described, an alternative number of stubs per sleeve, for example, one stub per sleeve, would also work. The stubs 70 have a flat upper edge for flush abutment against an upper edge of the aperture 72 while the lower side of the stub 70 is inclined for accommodating easy insertion of the sleeve 64 or 66 into the respective tube 18 or 20. The sleeves 64, 66 also have a radially extending upper rim 73 for abutting an upper edge 75 of the tubes 18 and 20 effectively trapping a portion of the sidewall 58 of these tubes between the stub 72 and upper rim 73, and in turn, locking the sleeve 64 or 66 on the corresponding tube 18 or 20.

The aperture 62 for engaging the spring pin 50 on the bottom tube 20 is facing the back 74 (FIG. 4) of the push handle on the bottom tube 20 while the aperture 62 and spring pin 50 on the middle tube 18 faces the front 76 on the push handle (shown on FIG. 3). This configuration accommodates efficient transfer of vertical forces from the rush rod 30 through the upper end cap 34 and to the lower end cap 36. While plunger 32 is used to engage the first or upper end cap 34 and unlock the first connection 60, the first end cap 34 has its own downwardly extending plunger protrusion 78 for engaging and unlocking the lower, second end cap 36 at the second connection 61 in the extended state.

In operation, from the extended state, when the release device 28 is activated, the rush rod 30 is thrust downward which in turn pushes plunger 32 onto end cap 34. The protrusion 33 of the plunger 32 extends into the cut-out 44 and presses downward on the upper arm 47 of pawl-lever 46 on end cap 34. This downward motion rotates the pawl-lever 46 moving its lower arm 49, which slides the spring pin 50 into the end cap 34, and out of the aperture 62, on tube 18.

Once the spring pin 50 is disengaged, the user pushes downward on grip 22, which pushes tube 16 downward and into tube 18. This also slides the rush rod 30, plunger 32 and the end cap 34 downward within tube 18.

Eventually upper end cap 34 collides with lower end cap 36 at the second lower connection 61. With the plunger protrusion 78 engaging the pawl-lever 46 on end cap 36, the upper end cap 34 moves the spring pin 50 on the lower end cap 36 in the same way that was performed previously by the plunger 32 on the upper end cap 34. Once the spring pin 50 is removed from the aperture 62 on the bottom or third tube 20, pushing downward on the grip 22 now slides both tubes 16 and 18 into tube 20.

Figure 6:
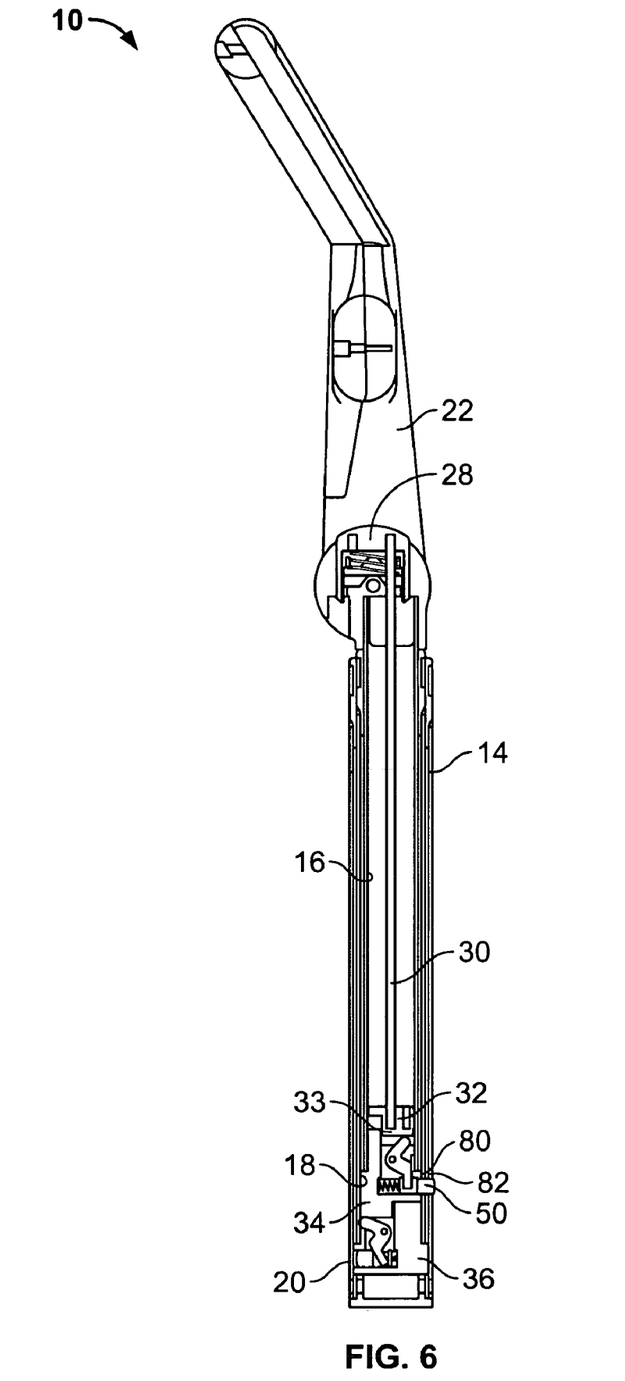
FIG. 6 is a cross-sectional, side view of the push handle in the retracted state.

Once the tubes 16, 18, 20 are positioned in the retracted state as shown on FIGS. 2 and 6, spring pin 50 on the upper end cap 34 is aligned with an aperture 80 (FIG. 6) near the bottom of middle tube 18 and an aperture 82 near the bottom of third tube 20 and in the front 76 of the body 14. When a user holding the grip 22 stops applying downward pressure to release device 28, the plunger 32 does not extend far enough into cut-out 44 to restrain the spring pin 50 within end cap 34, which allows the spring pin to be biased into the apertures 80, 82. The spring pin 50 of the lower end cap 36 is then restrained within third or bottom tube 20.

In order to extend the push handle 10 from the retracted state to the extended state, the release device 28 must be depressed again to remove spring pin 50 of the upper end cap 34 from the apertures 80, 82. The user can then pull tubes 16, 18 upward until the spring pins 50 engage apertures 62 and the ledges 38 abut the lower edges 68 of the sleeves 64, 66.

Figure 7:
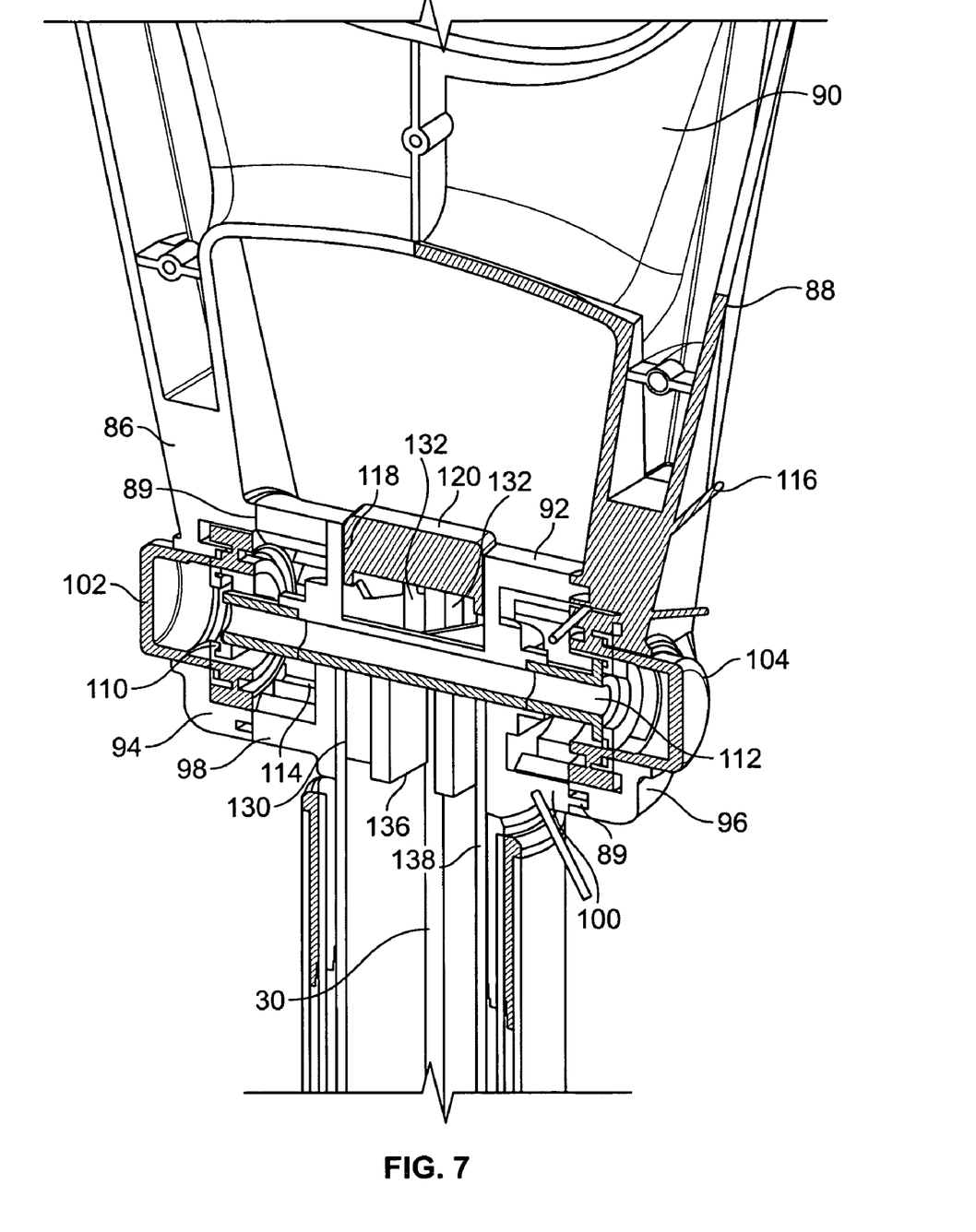
FIG. 7 is a cross-sectional, front perspective, elevational view of the grip and top section of the push handle of the present invention.

Referring to FIGS. 2 and 7, the grip 22 has a hand-engaging handle portion 84 with two main support members 86, 88 extending from opposite ends of the hand-engaging handle portion. The main support members 86, 88 extend generally perpendicular to the hand engaging handle portion (or at least perpendicular to the top of the hand engaging handle portion). A brace 90 bridges a gap between the support members 86, 88.

The grip 22 also has a grip rotation base or block 92 pivotally mounted on the top end 24 of the top tube 16. In the embodiment shown, the rotation block 92 is generally cylindrical and extends generally perpendicular to the longitudinal axis 56 of the body 14 (shown on FIG. 5A). Each support member 86, 88 has an end 94, 96 rotatably mounted on an opposing end 98, 100 respectively of the grip rotation block 92 for generally vertical rotation of the handle portion 84 as shown by arrow A on FIG. 5. Since the distance between the support members 86, 88 is generally fixed and corresponds to the length of the rotation block 92, the support members are laterally secured to the rotation block 92 with laterally extending, circular, tongue-and-groove connections 89 at the opposing ends 98, 100 of the rotation block.

In one embodiment, the grip 22 is made from two separately, integrally molded front and back pieces 91, 93 where each piece forms a portion of the hand-engaging portion 84, support members 86, 88 and the rotation block 92 as shown in FIG. 4. It will be appreciated that many other ways to manufacture the grip 22 exist with fewer or more parts than that shown in FIG. 4.

Referring to FIGS. 4 and 7, one opposing grip rotation button 102, 104 is positioned at each support member end 94, 96. The grip rotation buttons 102, 104 have hooked internal ends in the form of two opposing tabs that fit around bosses 110, 112. These bosses can be integrally formed with the support member ends 94, 96 (as shown on FIG. 7). The grip rotation buttons 102, 104 are secured to gears 106, 108 (as shown in FIG. 4). The gears are journaled on the bosses 110, 112 and are respectively positioned within a toothed-wall chamber 114, 116 cooperatively formed in the opposing ends 98, 100 of the rotation block and the ends 94, 96 of the support members. The walls of the chamber are toothed to accommodate lateral (relative to axis 56) sliding of the gears 106, 108 back and forth within the chambers 114, 116. The gears 106, 108 are biased by coil springs 103, 105 (FIG. 4) to a position that is partially within the support member and partially within the rotation block ends (or on the joints between support member and rotation block) effectively locking the support members 86, 88 so that they cannot rotate relative to the rotation block.

Depressing each grip rotation button 102, 104, moves the corresponding gear 106 or 108 entirely into the rotation block 92, out of the support member 86 or 88 and off of the joint between the rotation block 92 and the support members. This permits the support members 86 or 88 to rotate relative to the rotation block 92 when the grip rotation buttons 102, 104 are depressed and locks the support members in position when the buttons are released. With this configuration, the grip 22 can be rotated to a variety of vertical positions or angles relative to the longitudinal axis 56 of the body 14 which provides a comfortable and/or strong hold for user's of a variety of heights and with a variety of hand positions.

Referring to FIGS. 3-4, 5A and 7, the release device 28 is also positioned on the rotation block 92 of the grip 22. In this embodiment, the rotation block 92 has a vertically extending bore 118 for holding the release device 28, which in this case is telescope push-button 120. The push button 120 has two opposing downwardly extending tabs 122 with hooked ends 124 (shown in FIG. 5A) for hooking onto the rotation block 92 to prevent ejection or pull-out of the push button 120. The top end of the rush rod 30 is secured within a hole 126 open to the interior of the push button.

The rotation block 92 has a main beam 128 separating the bore 118 from a lower bore 130. A number of support fins 132 radially extend from a central axis (not shown) of the bore 118, which coupled with the man beam 128 extending through the bores 118, 130, provides enough gap for communication between bore 118 and bore 130 for rush rod 30 to extend through both bores and out of rotation block 92. A helical spring 134 (shown on FIG. 5A) is provided on top of fins 130 to bias the push button 120 upward. With this configuration, the vertical activation or operation of the release device 28 is secluded from, and does not interfere with, the horizontally extending activation or operation of the grip rotation buttons even though all the buttons are disposed on the single rotation block 92. Lower bore 130 holds the top end 24 of the top tube 16, and has its own radially extending fins 136 for holding the top end 24 of tube 16 within a gap 138 between the fins 136 and walls 140 of bore 130.

Referring to FIGS. 1 and 8, for the illustrated embodiment, the push handle 10 can be attached to a seat 142 for a tricycle 12. Here, a seat back 144 has a back or exterior wall 146 (when assembled as shown in FIG. 1) with a generally, horizontally extending protrusion 148. The exterior wall 146 defines a generally vertically extending hole 150 on the protrusion 148 that is dimensioned to match the shape of the periphery of the tube 20. The exterior wall 146 also forms a generally vertically extending, elongated groove or slot 152 that is aligned with the hole 150.

In this embodiment, the protrusion 148 is a separately molded piece that attaches to the seat back 144 with fasteners such as screws (not shown) at screw holes 154 (although any fastener can be used). This separate configuration permits easier placement of push handle body 14 through hole 150 by providing access to the back or interior of protrusion 148. It will be appreciated, however, that many other configurations are possible such as placing the push handle directly into a one-piece seat back.

Once the handle body 14 is placed through hole 150, and the protrusion 148 is assembled on seat back 144, the handle 10 can be pushed through groove 152 where it is dimensioned for a snug fit around the body 14 and tube 20 that does not interfere with expansion or retraction of the push handle. In this mounted position, the push handle does not disturb the balance of, or tip over, the tricycle when it is not gripped by a user.

In one embodiment, the push handle 10 has a bottom end cap 156 (FIG. 4) with opposing apertures 158 that align with opposing fastener apertures 160 near the bottom of bottom tube 20. A fastener (not shown) is placed through the fastener apertures 160, and through apertures 158 on the bottom end cap 156 and finally into a fastener bore (not shown) on the seat or seat back for securing the bottom end of the push handle on the seat back.

It will be appreciated that the locking mechanism 26 may be used to only partially collapse a push handle or work in concert with other mechanisms such that a body with at least one end cap disposed on at least one tube as described above is still within the scope of the invention.

It will also be appreciated that providing any number of tubes over two tubes on a telescoping body is within the scope of the invention.

Further, it will be appreciated that the number and positioning of apertures 62, 72, 82 as well as the positioning of the locking mechanism 26 can vary widely within body 14 and still be within the scope of the present invention.

While some of the embodiments of the invention have been shown and described, it will be apparent to those skilled in the art that changes and modifications may be made therein without departing from the spirit of the invention, the scope of which is defined by the appended claims.

What is claimed is:

1. A push handle for a child's vehicle, comprising:
    an elongated body, said body having at least two elongated tubes of different diameters configured in a telescoping relation wherein said tube(s) of smaller diameter(s) are slidable within said tube(s) of larger diameter(s) between an extended state and a retracted state, said tubes including a top tube with a top end and a bottom tube, said bottom tube being fixed to said child's vehicle;
    a grip mounted on said top end of said top tube for gripping by a hand of a user;
    a locking mechanism disposed within said body for locking said tubes in either said extended state or said retracted state;
    a release device disposed on said body and activated for remotely unlocking said locking mechanism so that said body may be moved between the extended and retracted states;
    a rush rod extending from said release device to said locking mechanism, said rush rod disposed and configured to cause said locking mechanism to disengage from at least one of said tubes upon movement of said rush rod toward said locking mechanism; and
    a plunger, and wherein said rush rod has a first end connected to said release device and a second end connected to said plunger, wherein said plunger engages said locking mechanism.

2. The push handle of claim 1, wherein said release device is disposed near said top end.

3. The push handle of claim 2, wherein said release device is disposed on said grip.

4. The push handle of claim 1, wherein said release device is one selected from the group consisting of a push-button, switch and knob.

5. The push handle of claim 1, wherein said locking mechanism includes an end cap disposed on an end of at least one of said tubes, a pawl-lever rotatably mounted on said end cap, a slidable pin disposed on said end cap and engaging said pawl-lever, and a biasing member biasing said pin toward an outer periphery of said end cap.

6. The push handle of claim 5, wherein at least one of said tubes has a sidewall defining an aperture for engaging said pin for locking said two adjacent said tubes in a longitudinal position relative to each other, said biasing member biasing said pin into said aperture when said aperture is aligned with said pin,
    said plunger configured to engage and rotate said pawl-lever, said pawl-lever being rotatable for removing said pin from said aperture.

7. The push handle of claim 5, wherein said body includes at least three said tubes defining at least two connections between adjacent said tubes when said tubes are in said extended state, said end cap engaging said plunger of said rush rod being a first end cap and being disposed at a first said connection between a top said tube and a second said tube,
    wherein said locking mechanism has at least a second end cap disposed at a second said connection between said second and a third tube, said second end cap locking said second and third tubes at least in said extended state, said first end cap having a plunger surface for engaging said second end cap, for unlocking said second connection.

8. The push handle of claim 7, wherein said second end cap has a second pawl-lever rotatably mounted on said second end cap, second biasing member and second pin biased by the second biasing member into a position for locking said second connection and engaging said second pawl-lever, said first end cap engaging said second pawl-lever of said second end cap for unlocking said second connection.

9. The push handle of claim 7, wherein said third tube is said bottom tube, and wherein said pin of said first end cap extends through apertures on both said second tube and said bottom tube for locking said body in said retracted state.

10. The push handle of claim 9, wherein said release device is activated to remove said pin from said apertures on both said second and bottom tubes for unlocking said body in said retracted state.

11. The push handle of claim 5, wherein said pawl-lever and said pin are configured and disposed to prevent ejection of said pin from said push handle.

12. The push handle of claim 1, wherein each said tube has at least one aperture for being locked into both said extended state and said retracted state.

13. The push handle of claim 1, wherein said grip is rotatably mounted on, and rotatable relative to, said top end of said top tube for selective rotation to one of a plurality of positions.

14. The push handle of claim 9, wherein said elongated body generally defines a longitudinal axis, and wherein said positions each define a different angle relative to said axis.

15. The push handle of claim 9, wherein said grip is vertically rotatable relative to said top end.

16. The push handle of claim 9, wherein said release device is disposed on said grip.

17. The push handle of claim 16, wherein said grip has means for preventing rotation of said grip and at least one grip rotation button for disengaging said rotation preventing means, wherein said means for preventing rotation and said at least one grip rotation button avoids interference with said release device.

18. The push handle of claim 17, wherein said release device is a vertically activated button on said grip and said grip rotation button is horizontally activated on said grip.

19. The push handle of claim 18, wherein said grip includes a grip rotation block and two opposing said grip rotation buttons disposed on said grip rotation block, said release device being disposed on said grip rotation block between said grip rotation buttons.

20. The push handle of claim 1, wherein said grip pivots about a horizontal axis on said body.

21. The push handle of claim 1, wherein said child's vehicle is a tricycle and includes a seat back defining a hole and a groove aligned with said hole, and wherein said bottom tube is disposed in said hole and said groove for fixing the push handle in an elevated position on said tricycle.

22. A push handle for a child's vehicle, comprising:
a single, elongated body having a bottom portion for attaching to the vehicle, a top end and a selectively changeable length between at least an extended state and a retracted state;
a grip rotatably mounted on, and rotatable relative to, said top end, said grip being selectively rotatable to a plurality of positions and including a hand-engaging handle portion, at least one main support member connected to said hand engaging portion, and a rotation block mounted on said top end of said body, said support member(s) being rotatably mounted on said rotation block;
said hand-engaging handle portion of said grip spanning two said main support members, said support members each having an end rotatably mounted on an opposing end of said grip rotation block, each said support member end having one said grip rotation button for permitting rotation of said support member it is connected to;
a locking mechanism disposed in said body for locking said body in either said retracted state or said extended state;
a release device remotely connected to said locking mechanism for unlocking said body in said retracted or said extended state when activated by a user, said release device being disposed on said rotation block; and said release device activated generally vertically while said grip rotation buttons are activated generally horizontally.

23. The push handle of claim 22, wherein said elongated body generally defines a longitudinal axis, and wherein said positions each define a different angle relative to said axis.

24. The push handle of claim 22, wherein the grip pivots about a horizontal axis upon said top end.

25. The push handle of claim 22, wherein said rotation block has means for preventing rotation of said support member(s), and at least one grip rotation button disposed on said rotation block for disengaging said rotation preventing means to permit rotation of said support member(s).

26. The push handle of claim 25, wherein said means for preventing includes a gear engaged with one said grip rotation button, and a chamber cooperatively defined by one of said support members and a corresponding end of said rotation block, one said grip rotation button being disposed on one said support member,
wherein said gear is disposed on a joint between said rotation block and said support member, and within said chamber, for locking said support member in place when said grip rotation button is not depressed, and
wherein said gear is pushed entirely off of said joint for permitting rotation of said support member when said grip rotation button is depressed.

27. A push handle for a child's vehicle, comprising:
a single, elongated body having a bottom portion for attaching to the vehicle, a top end and a selectively changeable length between at least an extended state and a retracted state;
a grip rotatably mounted on, and rotatable relative to, said top end, said grip being selectively rotatable to a plurality of positions and including a hand-engaging handle portion, at least one main support member connected to said hand engaging portion, and a rotation block mounted on said top end of said body, said support member(s) being rotatably mounted on said rotation block;
said hand-engaging handle portion of said grip spanning two said main support members, said support members each having an end rotatably mounted on an opposing end of said grip rotation block, each said support member end having one said grip rotation button for permitting rotation of said support member it is connected to;
a locking mechanism disposed in said body for locking said body in either said retracted state or said extended state;
a release device remotely connected to said locking mechanism for unlocking said body in said retracted or said extended state when activated by a user, said release device being disposed on said rotation block; and
said release device disposed between said grip rotation buttons.

* * * * *